United States Patent
Miller et al.

(10) Patent No.: US 6,867,777 B2
(45) Date of Patent: Mar. 15, 2005

(54) TRACING AND STORING POINTS OF INTEREST ON A GRAPHING CALCULATOR

(75) Inventors: Michelle A. Miller, Plano, TX (US); Jian Zhang, Dallas, TX (US); Michael E. Hosea, Wylie, TX (US)

(73) Assignee: Texas Instruments Incorporated, Dallas, TX (US)

( * ) Notice: Subject to any disclaimer, the term of this patent is extended or adjusted under 35 U.S.C. 154(b) by 423 days.

(21) Appl. No.: 09/742,902

(22) Filed: Dec. 20, 2000

(65) Prior Publication Data

US 2002/0075227 A1 Jun. 20, 2002

(51) Int. Cl.[7] ............................. G09G 5/00; G06F 17/00
(52) U.S. Cl. ....................................... 345/440; 345/856
(58) Field of Search ................... 345/754, 33, 157–164, 345/711, 596, 440, 856, 169; 710/73; 708/130, 131, 174

(56) References Cited

U.S. PATENT DOCUMENTS

| | | | | |
|---|---|---|---|---|
| 5,050,312 A | * | 9/1991 | McCannon | 33/700 |
| 5,532,946 A | * | 7/1996 | Phipps et al. | 708/174 |
| 5,739,823 A | * | 4/1998 | Akaza et al. | 345/440 |
| 5,907,317 A | * | 5/1999 | Tanaka et al. | 345/593 |
| 6,014,127 A | * | 1/2000 | Blomqvist | 345/856 |
| 6,029,214 A | * | 2/2000 | Dorfman et al. | 710/73 |
| 6,459,422 B1 | * | 10/2002 | Kirk | 345/169 |
| 6,487,424 B1 | * | 11/2002 | Kraft et al. | 455/566 |

* cited by examiner

*Primary Examiner*—Jeffery A. Brier
(74) *Attorney, Agent, or Firm*—J. Dennis Moore; W. James Brady, III; Frederick J. Telecky, Jr.

(57) ABSTRACT

A graphing calculator (10) having an X=Editor with inequalities. The calculator (10) is programmed to provide an X=Editor which displays one or more "X=" to allow input of a vertical line inequality. The X=Editor allows the user to input an inequality symbol and a constant for each X, allows the user to select or deselect each X, and a graph function to graph each selected X on the X=Editor display.

22 Claims, 2 Drawing Sheets

TRACING AND STORING POINTS OF INTEREST ON A GRAPHING CALCULATOR

TECHNICAL FIELD OF THE INVENTION

This invention relates to electronic calculators, and more particularly to a calculator which allows the user to trace points of interest on the display and store the points to a list.

BACKGROUND OF THE INVENTION

Electronic calculators have become a common tool for teaching students mathematics. In particular, the advantages of graphing calculators are being utilized in the classroom. Graphing calculators are characterized by a larger screen, which permits the entry of mathematical expressions in a logical format. They also permit graph displays and table displays. They have sophisticated programming capability. They often permit data transmission to other computing devices, directly or via a data storage medium, as well as data collection via various interface protocols. Particular calculator models are often designed for particular educational levels. For example, a calculator for middle school students might have less advanced features than one designed for older students. However, regardless of the level for which a calculator is designed, a continual goal in designing them is to provide a logical and easy to use interface.

Some prior art graphing calculators could identify intersection points between two functions. However, the user interface for these functions in the prior art was cumbersome and took some guesswork to find the points of interest (POI) or intersection points. Further, they were not particularly helpful in assisting the student to grasp the underlying mathematical concepts.

SUMMARY OF THE INVENTION

An embodiment of the present invention is a graphing calculator, which allows the user to easily identify and work with the intersection points of two or more functions. The invention uses a "trace" like function that lets the user quickly jump from one point of interest to the next while displaying the x and y coordinates. The user interface of the present invention calculator helps the student to more readily see and understand the concepts involved with line/function intersection. Similarly, other embodiments include the same user interface functionality in a software application package that is executed on a graphing calculator.

The calculator in the present invention may otherwise be a conventional graphing calculator. Namely, the calculator screen is capable of two-dimensional displays and of displaying at least straight lines in any direction and a cursor. A key panel has keys at least capable of selecting positions of the cursor and moving the cursor horizontally or vertically on said screen. A processor is operable to execute points of interest application programming that instructs the processor to perform the following steps: Invoke the Y=Editor and/or the X=Editor displays to define equations, inequalities and/or vertical lines, graph the defined lines, select the points of interest display, allow the user to jump the cursor between intersection points with simple arrow key commands and store the location coordinates of the cursor at desired points with a store command.

In an embodiment of the invention the coordinates of the current cursor location, when at a point of interest or any other cursor location, can be stored to a list for additional use or processing.

In a further embodiment of the invention, the coordinates and the function identifiers of the two intersecting functions are also displayed on the screen for the point at the cursor location.

In another embodiment, the identifiers for the functions at the cursor location reflect the inequality of the functions if either function is a strict inequality, further reinforcing the mathematical concepts.

DETAILED DESCRIPTION OF THE INVENTION

Figure 1:
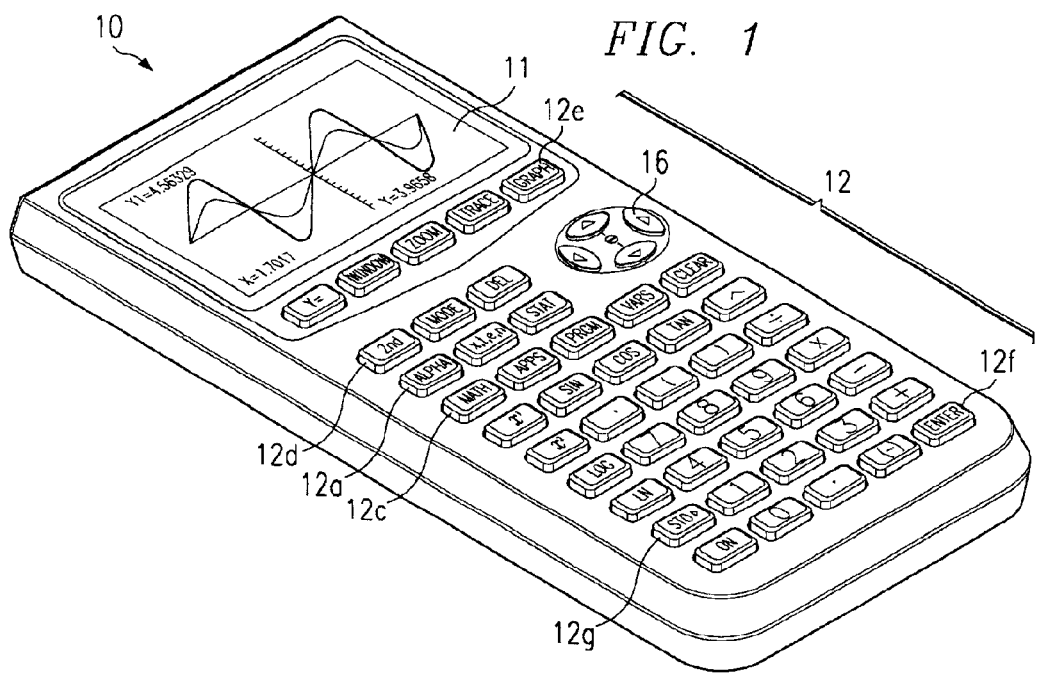
FIG. 1 illustrates the front panel of a calculator 10 having the Points of Interest features of the present invention.

FIG. 1 illustrates the front panel of a calculator 10, which has the X=editor features of the present invention. Calculator 10 is described herein in terms of particular software and hardware features of the TI-83 Plus, a commercially available graphing calculator manufactured by Texas Instruments Incorporated. Apart from the features of the present invention, many of the features of calculator 10 described herein are typical of graphing calculators, while other features are unique to the TI-83 Plus or to its "family" of TI calculators. The use of the TI-83 Plus is for purposes of description, and does not limit the invention. The features that are the subject of the present invention could be incorporated into other calculators that provides graphical displays, or they could be incorporated into other computer based teaching tools and handheld computers.

In FIG. 1, the screen 11 of calculator 10 has a "graphical display", as that term is used herein. In addition to the ability to draw graphical displays of various types, some of the software features of calculator 10 include, software applications loading and storage, keystroke programming. It also permits data collection, display and analysis.

Various hardware features include a large pixel screen 11, which is 64×96 pixels. A keypad 12 has various keys for data and command entry, some of which are used to implement the invention and are described herein. Other features are an I/O port for data linking, a 32K byte RAM and 160K byte application space, and a unit to unit link cable connection capability.

As is typical of calculators, calculator 10 has a secondary function key, 2nd key 12a, which permits other keys to have two functions. For example, by pressing 2nd key 12a and then Stat/List key 12b, the user enters the statistical functionality. For simplicity of explanation herein, a key having two functions is referred to in terms of the function appropriate for the context, i.e., when discussing the Stat function, Stat/List key 12b is referred to as the Stat key 12b. Similarly, calculator 10 has an Alpha key 12c, which when depressed makes the other keys subsequently depressed to input an alpha character.

Figure 2:
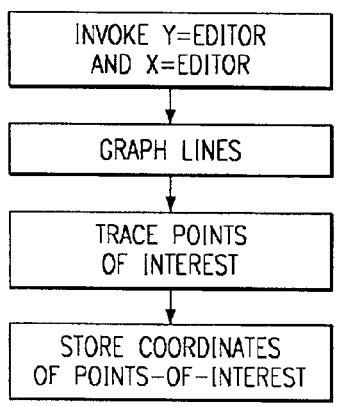
FIG. 2 illustrates the basic steps of using the calculator to use the Points of interest features in accordance with the invention.

FIG. 2 illustrates the basic steps of using calculator 10 to trace and store points of interest in accordance with the invention. FIG. 2 is drawn from the point of view of steps performed by the user. However, the same steps could be described in terms of activities performed by the computer. For example, steps involving entry of data by the user could also be described as receipt of data by the calculator.

The basic steps described in FIG. 2 are as follows: Invoke the Y=Editor and the X=Editor displays to define equations, inequalities and/or vertical lines, graph the defined lines and any appropriate shading, select the points of interest display screen, allow the user to jump the cursor between intersection points with simple arrow key commands and optionally store the location of the cursor at desired points with a store command. These steps are further described herein below.

Figure 3:
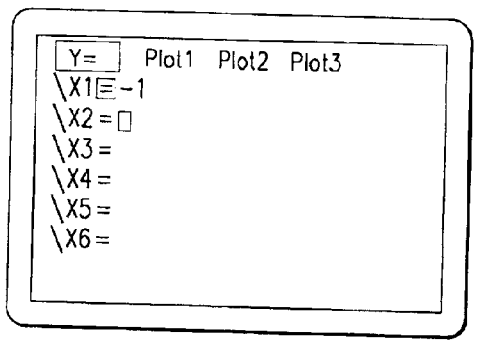
FIG. 3 illustrates a vertical line entered into the X=Editor.

FIG. 3 illustrates an example of the screen display for an X=Editor. The X=Editor is the subject of a co-filed, co-owned application. In the top left hand corner of the X=Editor display, the symbol "Y=" functions as a switch to toggle the display to the Y=Editor display. Similarly, when the display is showing the Y=Editor, the symbol "X=" is shown in this position.

The X=Editor display includes several $X_n$ lines, which allow the user to input vertical lines with equations and/or inequalities. Each $X_n$ line initially has the format of "\$X_n$=", where n is a number between 1 and 6. The symbol preceding the "X", initially a "\" symbol, represents the line type and inequality shading. The "=" symbol is in the position after the "$X_n$" and can be replaced with an relational symbol as described below.

Figure 4:
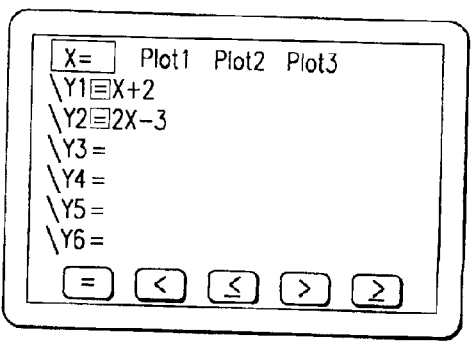
FIG. 4 illustrates two functions entered into the Y=Editor.

FIG. 4 illustrates an example of the screen display for a Y=Editor. The Y=Editor is similar to the X=Editor described above. The Y=Editor lets the user define functions in terms of X. The functions may be activated for graphing by selecting and highlighting the inequality symbol.

When the cursor is moved to the position of the relational symbol for any $X_n$, the available relational symbols are displayed on the last line of the display as shown in FIG. 4. The user is then able to change the symbol for the cursor location by pressing the alpha key followed by the key directly below the desired symbol on the display. When the relational symbol is selected the corresponding line type may be set to graph the inequality or line.

Figure 5:
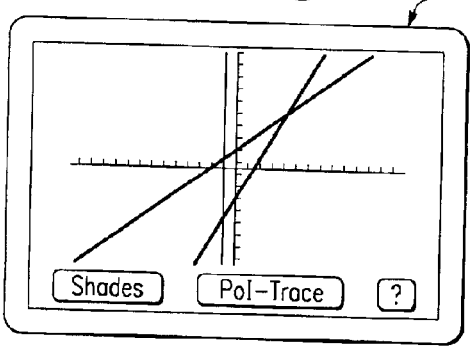
FIG. 5 illustrates the graph of the functions defined in FIGS. 3 and 4.

FIG. 5 illustrates a display screen of functions and lines described in the Y=Editor and X=Editor of FIGS. 3 and 4. This display is a result of the user pressing the graph key after defining the lines and functions in the X=Editor and Y=Editor as described above. At this point, in the illustrated embodiment, the user is given options at the bottom of the display to either show the inequality shading or to choose the points of interest (POI) trace function.

Figure 6:
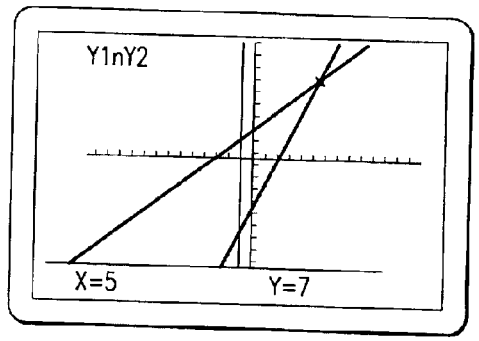
FIG. 6 illustrates the graph of the functions defined in FIGS. 3 and 4 with the cursor at the point X=5 and Y=7.

FIG. 6 illustrates the POI trace function when the user selects this function from the screen shown in FIG. 5. The display includes the graph of the functions and lines defined by the user and described in the previous paragraphs. In a preferred embodiment, the display further includes a cursor showing a point of interest (POI) for the described functions and lines. A point of interest is an intersection point of any combination of solid and dotted lines. Note, a dotted line is the equality line related to the strict inequality. For example, the intersection of lines X<5 and Y=2 is as the point (5,2) despite the fact that X=5 is not a member of the inequality X<5.

In another embodiment, the display further includes a display of the coordinates for the current POI. In the shown embodiment, the POI coordinates are shown as "X=5" and "Y=7". In yet another embodiment, the present invention includes a representation of which function or lines are contributing to the current POI shown by the cursor. In FIG. 6, the POI displayed is the intersection of Y1 and Y2, which is represented in the upper left of the display by Y1 and Y2 with the mathematical intersection symbol. This symbol is preferably used when mathematically correct according to the chosen functions. Thus if a strict inequality is defined, where the line is not technically part of the solution, then the display would not use the intersection symbol but could show something such as "Y1, Y2".

Figure 7:
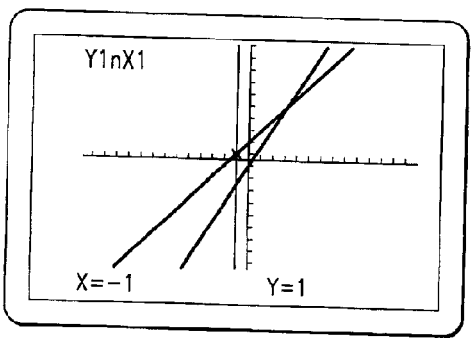
FIG. 7 illustrates the graph of the functions defined in FIGS. 3 and 4 with the cursor at the point X=−1 and Y=1.

FIG. 7 illustrates another POI trace function display. This display is a result of the user pressing an arrow key subsequent to the display shown in FIG. 6. The cursor jumps from the location (5,7) to (−1,1) as the next point of interest. Thus, advantageously over prior art, the user can quickly move from point to point with each activation of an arrow key or the like. This feature is called the tracing function.

The tracing function is a convenient feature to move the cursor to the intersections of the various functions involved in defining the system of inequalities. It is preferable to trace to all such points of intersection regardless of whether the intersection occurs on the boundary of the region satisfying all the inequalities.

The tracing function employs an algorithm to control the movement of the cursor to the intersection points in the tracing function. In a preferred embodiment, when the POI Trace is enabled, the algorithm begins with an intersection between the first and second active inequalities, usually the point of intersection between Y1 and Y2. Then, by using the up and down arrows, the first inequality is selected from those available, the left and right arrows then traverse the other active inequalities. In each case a point of intersection is computed.

On a graphing calculator, the algorithm does not make use of any computer algebra, so intersection points are computed numerically using a numerical root-finder such as the one built in the TI-83 calculator. This requires both upper and lower bounds on the solution and an initial guess. The upper and lower bounds can be taken as XMIN and XMAX for the graph window, and the initial guess can be taken as the current cursor position. Intersections with vertical (X=) inequalities are more easily obtained by evaluating the Y inequality at the value of X indicated by the vertical inequality.

In the nonlinear case there may be many intersections between two specified curves defining inequalities. The algorithm provides for finding one of these points of intersection. If other points are desired, the calculator's built-in root-finder can be used as it allows the user to set the initial guess close to a desired point of intersection.

In the previous embodiment all intersection points were considered "points of interest." In another embodiment, which is restricted to linear inequalities, the "points of interest" are more limited. In this case, the solution set to all the inequalities is called the "feasible region" in the terminology of Linear Programming. In the 2D case (our case), this region is polygonal. An initial feasible corner point of the feasible region can be found using standard Linear Programming techniques or even by trial-and-error. For any given corner point the Simplex Algorithm provides the means to identify the inequalities that determine it. Subsequently, using the Simplex Algorithm with an objective function that is selected to be perpendicular to a given side of the feasible region, which we now refer to as the "current" inequality, an adjacent corner can be found. In this way, choosing to minimize or maximize and choosing an appropriate objective function for each side, it is possible to traverse the corners of the feasible region in clockwise or counter-clockwise order by iterating the Simplex Algorithm until it reaches another intersection involving the current inequality. The algorithm then restarts from there. For corner points involving three or more inequalities, only one choice, besides the previous inequality, will define the edge of feasible region. Fortunately, the Simplex Algorithm will terminate immediately in the event that the wrong inequality has been chosen. The net effect of this algorithm is to allow tracing around the boundary of the solution set to system of linear inequalities. This is done clockwise or counterclockwise, as desired, visiting all corner points.

Figure 8:
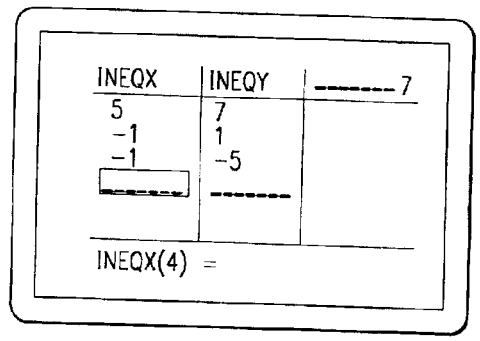
FIG. 8 show the list for the three intersections points for the lines in FIGS. 6 and 7.

FIG. 8 illustrates a display screen for the list function according to another embodiment of the present invention. The list captures the x and y coordinates for cursor locations that were stored to the list by the user. The user operates the trace function to move the cursor to one or more POI and then presses the "store" key 12g to record the current x and y coordinate of the cursor to the list. The list is preferably a first column containing the stored x coordinates adjacent to a second column containing the y coordinates. Additional columns can be used to store other data related to each coordinate pair during subsequent processing and use of the list.

Other Embodiments

Although the present invention has been described in detail, it should be understood that various changes, substitutions, and alterations can be made hereto without departing from the spirit and scope of the invention as defined by the appended claims.

What is claimed is:

1. A graphing calculator having a points of interest user interface comprising:
    a screen capable of displaying at least straight lines in any direction and a cursor;
    a key panel having keys at least capable of selecting positions of said cursor and moving said cursor horizontally or vertically on said screen;
    a processor programmed to provide the points of interest user interface having the following steps:
    a) providing an input display to allow the user to define a plurality of equations, inequalities and vertical lines,
    b) providing a points of interest display screen,
    c) displaying graphs of the defined equations, inequalities and vertical lines on the points of interest display screen, and
    d) jumping the cursor between points of interest, comprising intersection points of the graphs on the points of interest display screen, in response to a single key command.

2. The graphing calculator of claim 1, wherein said processor is further programmed to store the location of the cursor at points of interest with a store command that comprises a single key stroke.

3. The graphing calculator of claim 2, wherein said processor is further programmed to allow the user to display the stored points of interest and use the stored points of interest for other calculator functions.

4. The graphing calculator of claim 1, wherein said processor is further programmed to input equations, inequalities and lines using a Y=Editor and an X=Editor.

5. The graphing calculator of claim 1, wherein said processor is further programmed to provide an indication on the points of interest display screen of current coordinates of the cursor.

6. The graphing calculator of claim 1, wherein said processor is further programmed to provide an indication on the points of interest display screen of which equation, inequality or vertical lines contributed to the point of interest indicated at the cursor location.

7. The graphing calculator of claim 6, wherein the indication on the points of interest display screen of which function or vertical lines contributed to the point of interest indicated at the cursor location includes an intersection symbol for equations that include the line and does not use the intersection symbol for strict inequalities.

8. A graphing calculator having a points of interest display comprising:
    a screen capable of displaying at least straight lines in any direction and a cursor;
    a key panel having keys at least capable of selecting positions of said cursor and moving said cursor horizontally or vertically on said screen;
    a processor programmed with points of interest programming to perform the following steps:
    a) providing an input display to allow the user to define equations and vertical lines,
    b) displaying graphs of the defined equations and vertical lines on the points of interest display,
    c) jumping the cursor between points of interest comprising intersection points of the graphs on the points of interest display screen, in response to a single key command which moves the cursor to another point of interest with each key activation, and
    d) storing the location of the cursor at points of interest in response to a store command.

9. The graphing calculator of claim 8, wherein said processor is further programmed to allow the user to display the stored points of interest and use the stored points of interest for other calculator functions.

10. The graphing calculator of claim 9, wherein said processor is further programmed to provide an indication on the points of interest display of the current X and Y coordinates of the cursor.

11. The graphing calculator of claim 10, wherein said processor is further programmed to provide an indication on the points of interest display of which function or vertical lines contributed to a point of interest indicated at a current cursor location.

12. The graphing calculator of claim 11, wherein the indication on the display of which function or vertical lines contributed to the point of interest indicated at the cursor location includes an intersection symbol for equations that include the line and does not use the intersection symbol for strict inequalities.

13. The graphing calculator of claim 8, wherein said processor is further programmed to execute an algorithm to compute intersection points using a numerical root-finder which uses XMIN and XMAX for a graph window as the upper and lower bounds on the solution and the initial guess taken as a current cursor location.

14. The graphing calculator of claim 8, wherein said processor is further programmed to execute an algorithm to compute intersection points of linear inequalities to find points of interest around a boundary of a solution set to the linear inequalities by iterating a Simplex algorithm.

15. A method for providing a user interface for a graphing calculator having the following steps:

a) providing an input display to allow the user to define a plurality of equations, inequalities and vertical lines, b) providing a points of interest display screen, c) displaying graphs of the defined equations, inequalities and vertical lines on the points of interest display screen, and d) jumping a cursor between points of interest comprising intersection points of the graphs on the points of interest display screen, in response to a single key command.

16. The method of claim 15, further comprising the step of storing a location of the cursor at points of interest in response to a store command that comprises a single key stroke.

17. The method of claim 16, further comprising the steps of:

a) displaying points of interest at the stored locations, and b) using the stored locations of points of interest for other calculator functions.

18. The method of claim 15, wherein said step of providing an input display further comprises providing an input display to input equations, inequalities and lines using a Y=Editor and an X=Editor.

19. The method of claim 15, further comprising the step of providing an indication on the points of interest display screen of which functions or lines contributed to a point of interest indicated at a cursor location.

20. The method of claim 19, wherein the indication on the points of interest display screen includes an intersection symbol for equations that include the line and does not include the intersection symbol for strict inequalities.

21. The method of claim 15 further comprising the step of executing an algorithm to compute intersection points using a numerical root-finder which uses XMIN and XMAX for the graph window as upper and lower bounds on the solution and an initial guess taken as the current cursor position.

22. The method of claim 15 further comprising the step of executing an algorithm to compute intersection points of linear inequalities to find points of interest around a boundary of a solution set to linear inequalities by iterating a Simplex algorithm.

* * * * *